Dec. 11, 1956     G. A. DELF ET AL     2,773,365
VIBRATION-DAMPING HUB AND SHAFT ASSEMBLIES
Filed Nov. 23, 1953
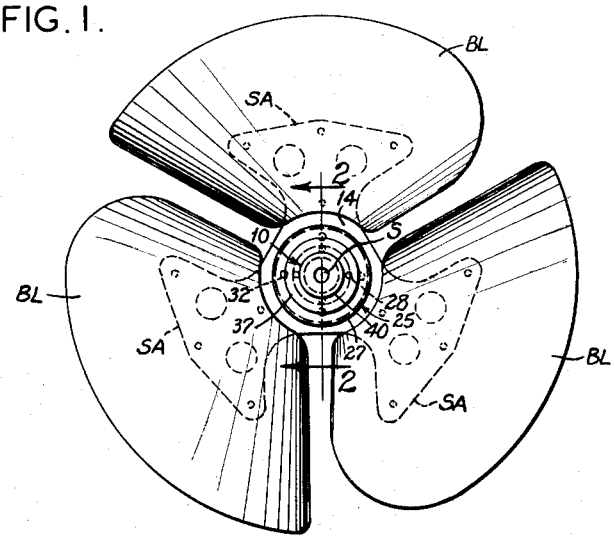
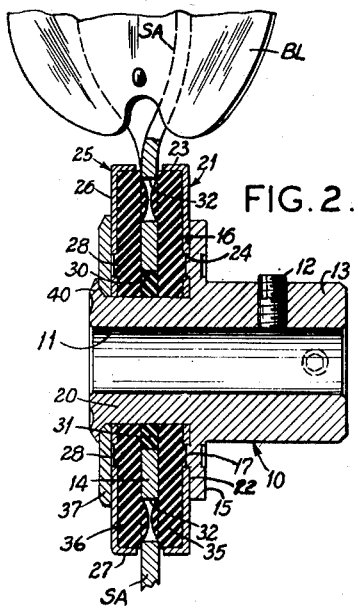
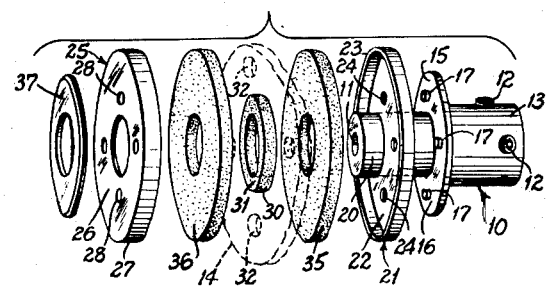
INVENTORS;
GEORGE A. DELF &
GLENN A. DELF.
BY Terry & Cohn
ATTORNEYS

United States Patent Office 2,773,365
Patented Dec. 11, 1956

2,773,365

VIBRATION-DAMPING HUB AND SHAFT ASSEMBLIES

George A. Delf and Glenn A. Delf, St. Louis, Mo.

Application November 23, 1953, Serial No. 393,838

6 Claims. (Cl. 64—11)

This invention relates to vibration-damping hub and shaft assemblies, and more particularly to an improved assembly of rotary shaft, hub and a hub-mounted member, in and with which are utilized improved means for minimizing the transmission of vibration between the shaft and driven member. While the present improvements are particularly adapted for use in connection with the hub mounting of propeller and other types of fans, they are by no means limited to these fields of usage.

We are aware that many structures have heretofore been evolved with the purpose of minimizing the transmission of vibrations between, for example, a fan and fan shaft. However, all such devices which have thus far been noted, have attained only an indifferent degree of success, due in most cases, to a decidedly incomplete interruption of sound-conducting paths. Furthermore, many of the devices formerly employed in an attempt to reduce vibration and sound transmission, are inordinately expensive in either or both material and labor costs; still others present considerable difficulties in maintaining balance of the rotating agencies served thereby; still other former expedients for the purpose noted are subject to angular displacement of their parts with impairment of balance, to enumerate but a few of the earlier prevalent difficulties. It is accordingly a major and general objective of the present improvements to overcome each of the noted difficulties characterizing earlier resilient hub constructions.

Of particular importance as an objective of the present improvements, is the embodiment of certain resilient sound-absorbing cushioning elements in a manner positively to maintain the "set" and "track" of the driven blade elements, together with a substantially complete enclosure of these cushioning elements.

Yet another valuable object of the present improvements is realized in unique means for permanently maintaining the concentricity of the parts of a hub structure including yieldable cushioning and sound-absorbent elements.

A still further important object of the present invention is realized in an arrangement such that a propeller-type fan, for example utilizing a center disc, plate or equivalent portion of a spider, is hub-mounted so that those portions of the center disc or spider which are operatively connected to the hub, are entirely isolated from metallic contact with the hub and hub-carried elements in such manner as to preclude any continuous metal path for transmission of vibrations.

A further general object is realized by the present improvements, in a low-cost vibration-absorbent hub structure of rugged character such as to retain an initial balanced condition, and which serves effectively to dampen vibrations of any and all nature, otherwise possibly communicated between a shaft and a rotary member functionally connected thereto.

The foregoing and numerous other objects will more clearly appear from the following detailed description of an embodiment particularly preferred for use as a propeller fan mounting, and from the accompanying drawing, in which:

Fig. 1 is a face or plan view of the discharge or delivery side of a propeller fan equipped according to the present improvements;

Fig. 2 is an enlarged sectional view through the hub region of the structure of Fig. 1, Fig. 2 being located by line 2—2 of Fig. 1, and Fig. 3 is an exploded view of the hub and immediately appurtenant elements showing the relation thereof prior to assembly, the spider arms being omitted from the center disc portion of Fig. 3 for clarity of illustration.

Referring now by characters of reference to the drawing, a shaft, exemplified as a power driven rotary element, is indicated at S (Fig. 1). The shaft carries, usually at one end thereof, a hub structure generally indicated at 10, and provided with a shaft bore 11, into or through which the shaft extends, the hub being secured thereto as by one or more set screws 12 located in threaded apertures in a larger diameter portion 13 of the hub.

For present description it will be assumed without limitation that the portion 13 is located nearest the drive motor or the like (not shown) and the opposite end of the hub 13 at the air-delivery end of the assembly, the larger and smaller diameter ends of the hub being sometimes referred to for ease of description as the rear and front ends respectively, in reference to the fan. While the features and arrangement of fan blades are not material to the present improvements, it is briefly noted that the fan as shown includes three blades BL, each attached to and rotatively supported by one of the spider arms SA. The arms SA project radially from a center plate or disc portion of the spider, such center disc portion being best shown in dotted lines by Fig. 3, but for clarity of illustration, without the arms, the center disc being indicated at 14.

The hub 10 just forwardly of the larger diameter portion 13 is provided with a large shoulder formation indicated at 15. The formation 15 is characterized by a planar face 16, the face 16 being characterized by a plurality, shown as four, of forwardly projecting lugs or "dimples" 17, the lugs 17 being formed by depressing or indenting a portion of shoulder formation 15. Forwardly of the shoulder formation 15 is a hub portion 20 of reduced diameter, fitted over which is a cup structure 21 consisting of a planar plate 22, carrying a peripheral flange 23. The plate portion 22 is provided with a plurality of recesses or apertures 24, the sizes, angular spacing and location of which conform to the lugs 17 on the hub shoulder 15 in such manner that, as will appear in Fig. 2, each of the lugs 17 will in assembly interfit a correspondingly located recess 24.

A second such cup formation corresponding closely to the element 21, is indicated generally at 25, and comprises a plate 26, and a peripheral flange 27, the plate 26 being provided with recesses or apertures 28, which are counterparts of the recesses 24.

The center disc 14 is provided with a central aperture located by the numeral 30, and which is of appreciably larger diameter than that of the reduced hub portion 20, as is particularly desired in avoidance of any direct metal contact between any parts of the spider and of the hub. The diametral difference noted is compensated for by a sound-absorbent and vibration-damping annulus 31. The element 31 is of sufficient firmness as to assure concentricity and permanent mutual coaxial relation of the hub, shaft, and the spider, hence also the fan. The fiber element 31 however exhibits a considerable resilience and vibration-damping property.

Outwardly of the center aperture 30 of the disc 14 are a plurality, shown as four, of openings 32, serving a purpose later appearing.

Preferably coextensive in area with the side faces of the center disc portion 14, and contiguous thereto, are a pair of compressively resilient, cushioning and vibration-absorbent discs 35 and 36, the disc 35 engaging the rear side of the center disc 14 and the disc 36 the opposite or front face of the disc. Each of the discs 35 and 36 is of a diameter such as to interfit and be substantially enclosed by the adjacent cup 21 or 25. Each of the cushion discs is provided with a center opening of a diameter approximating the small diameter portion 20 of the hub, so as to be readily fitted thereover in the assembly position now apparent from Fig. 3. While the selection of material of the damping discs 35 and 36, is not critical, a high degree of compressive resilience has been found desirable for these elements. Normally they should be of some greater initial thickness than the depth of the cup, such as 21 or 25, serving to house the resilient disc. This relation of the elements is selected so as to permit, as is desirable, the assembly of the elements 35 and 36 under at least a moderate compression. A relatively soft stock of rubber or other plastic material has been successfully utilized for the compressive elements.

Forwardly beyond the front cup 25 of the assembly is a washer 37, the opening through which is of a diameter such as to be passed over the small diameter portion 20 of the hub.

Those parts of the assembly as thus far described, except the discs 31, 35 and 36, are presumed, without limitation but in keeping with present commercial practice, to be formed of a suitable ferrous or other metal.

The order of assembly of the elements is thought to have become apparent from the exploded view of Fig. 3 and the description of the parts, but it may be noted that with the hub 10 suitably jigged, the cup 21 is fitted over the portion 20 with recesses 24 brought to register with the lugs 17 and interfitted therewith. The disc 35 is then applied over the hub portion 20 and into cup 21, followed by the washer 31, and the spider applied with its center opening over the annulus 31 in such manner that this element substantially fills the spider disc center opening and fully bridges the space between the hub portion 20 and the margins of the center aperture of the disc 14. The second resilient disc 36 is then applied, followed by cup 25 and washer 37. The elements thus described are then subject to compression in a direction axially of the hub and are so retained to permit deformation of the outer end of the hub as by peening by air hammer or otherwise so as to result, in the example shown, in a coined edged, outwardly flared portion indicated at 40. It will now have appeared particularly from Fig. 2, that the shoulder formation 15 of the hub coacts with the portion 40 to retain the parts therebetween, in axially fixed position on the hub.

Quite importantly it will now have appeared that when the assembly is functionally considered, the cup 21, specifically the plate portion 22 thereof, is securely angularly tied to the hub shoulder formation 15 by the interfitting engagement of the recesses 24 and lugs 17. It is further important to note that, since the resilient disc 35 is under compression, portions of same will enter the recesses 24 as is clearly shown in Fig. 2, thus positively precluding any rotation of disc 35 with respect to the adjacent cup or to the hub. The pair of resilient discs 35—36 quite securely serve to prevent any angular displace of the center disc 14, hence of the spider, about the hub, due to the pronounced penetration of the apertures 32 of the center disc by portions of the compressible discs, as will appear from Fig. 2.

Similarly to the interfitting and angular interlock provisions described, no relatively angular or other displacement of the center disc and disc 36 is possible, due to the fact that portions of the compressible disc 36 extend into the openings 32. Likewise, portions of compressible disc 36 extend appreciably into the adjacent recesses 28 provided in plate 26, thus positively precluding any angular shift of either of these elements with respect to the other or with respect to the hub. The inner margin of washer 37 may if desired be serrated or interrupted although not so shown, so as to be interfitted by the outwardly deformed portion 40. It will now have appeared that each of the elements of the assembly is firmly tied to each other element against either angular displacement or axial disturbance of its original position and relation.

A particular advantage, besides making for better appearance, of the cups 21 and 25, lies in the fact of virtually complete confinement of the resilient discs by the cups. It has been found that, unless a resilient disc or bushing is peripherally confined, peripheral extrusion or spread of such elements will often result in an out-of-balance condition, sometimes permitting spalling or destruction of such projecting parts.

It is particularly preferred that the thickness of the discs 35—36 and the depth of the cups 21—25 be so selected that the inner margins of the flanges on the cups avoid contact with the spider disc or arms, a suitable spacing of these parts being shown by Fig. 2. This arrangement prevents any direct vibration transmission path between the hub via the cups, into the spider or spider arms. The same result is furthered by forming the center aperture of the disc 14 larger than the adjacent part of the hub and bridging these diameters with a non-metallic washer such as 31.

It will have appeared from Fig. 2 that the arrangement described definitely avoids any path through metal parts, for the transmission of sound or other vibrations from the shaft to the fan or from fan to shaft. It should be noted also that since the innermost supporting portion of the spider is virtually completely embraced by a mass of cushioning material, the propeller is susceptible of a moderate temporary displacement from its intended plane of operation, since the spider arms may thus be deflected slightly in a forward or rearward direction against the cushioning effects of elements 31, 35 and 36. Under certain circumstances, as due to the effect of gusts of wind or the like, this facility will prevent noise transmission from the fan into the shaft. Furthermore it should be noted that if, for any reason, the rotary system may be subject to torsional vibrations, same will be largely absorbed by the described damping assembly.

Although the description is related to its use in and with a propeller fan assembly, it is equally adaptable, with or without minor changes, to other rotary shaft- or hub-mounted apparatus.

Although the invention has been described by detailed reference to a preferred embodiment, the detail of description should be understood in an instructive, rather than in any restrictive sense, numerous variants being possible within the fair scope of the claims hereunto appended.

We claim as our invention:

1. In a shaft-driven rotary assembly subject to communication of vibrations between a rotary member and a shaft, a drive shaft, a hub secured to the shaft, a rotary member including a center disc, said center disc being provided with a plurality of apertures, a bushing structure of a non-metallic resilient material, the center disc being provided with a central hub aperture the margins of which are spaced from the hub, the resilient material being disposed between the hub and the center disc in the region of the central hub aperture, and overlying the opposite faces of the center disc under compression such that portions of the resilient material extend into said apertures of said center disc, a shoulder formation on said hub, said shoulder formation being provided with a plurality of projections, a plate element provided with a plurality of recesses adapted to receive and be interfitted by said projections, the resilient material disposed adjacent said plate element under compression so that a portion extends into the recesses of said plate element, a second plate element mounted on said hub, and provided with a plurality of recesses, said resilient material having portions on the other side of said center disc that extend into the recesses of said second plate element, and means including portions of the hub for axially and angularly fixing the center disc, plate elements, and resilient material to the hub.

2. In a rotary fan, hub and drive shaft assembly, a fan spider including an apertured center disc element, a hub engaging the shaft and extending through the aperture of the center disc element in spaced relation to the margins of the hub aperture, a non-metallic bridging piece between the hub and margins of the hub aperture, the center disc element being provided with a plurality of apertures, a pair of compressively elastic disc elements laterally engaging the opposite faces of the center disc element under compression so that portions of said elastic elements extend into said apertures, a pair of plate elements respectively engaging the outer faces of said elastic elements, said plate elements being provided with a plurality of recesses, said elastic disc elements extending into said recesses under compression, a shoulder on said hub, said shoulder having a plurality of projections adapted to interfit the recesses of one plate element, and means including portions of the hub for clamping said elements against said shoulder, whereby to fix said elements axially and angularly on said hub.

3. In a fan, hub and drive shaft assembly, a fan spider including a center element provided with a central aperture of a size to receive the hub in spaced relation inwardly of the margins of the hub aperture, a non-metallic annulus over the hub and within the hub aperture, serving to space the spider from, and in concentric relation to the hub, a pair of cushioning disc elements apertured to receive the hub, with the hub extended through the apertures thereof, and with the inner faces of the cushioning elements engaging opposite faces of the center element, a pair of spaced metal plate elements located just outwardly of the outer faces of the cushioning elements, and being apertured for the reception of the hub, said center element being provided with a plurality of apertures, said plate elements being provided with a plurality of recesses, said cushioning elements having portions extending into said apertures and said recesses incident to compression of said cushioning elements, a shoulder portion on said hub, said shoulder portion being provided with a plurality of projections adapted to interfit the recesses of one plate element, said shoulder portion abutting the last said plate element, a washer disposed over the hub and abutting the other said plate element, the hub having a deformed portion coacting with the shoulder portion for retaining said elements in axially and angularly fixed relation to the hub and to each other.

4. In a shaft, hub and fan assembly, a fan spider including an apertured center disc through which the hub extends in spaced relation, a non-metallic sound damping annulus within the hub aperture of the spider and about the hub, a pair of highly compressive, vibration-absorbent discs engaging opposite faces of the center disc of the spider, a pair of cup elements mounted in opposed relation on opposite sides of the assembly of compressive discs and spider, with the margins of the cup elements spaced from the adjacent portions of the spider, portions of the spider being apertured outwardly of its center opening, the last said apertures being adapted to receive portions of the resilient discs in assembly, for angularly positioning the compressive discs to the center disc, each of said cup elements being provided with a plurality of recesses, said compressive discs having portions thereof extending into said recesses under compression of said discs, a shoulder formation on the hub, said shoulder formation being provided with a plurality of outstruck projections adapted to interfit the recesses of one cup element, and means including portions of the hub for maintaining the cups and discs axially assembled to the hub with the compressive discs under compression within the cups.

5. In an assembly including a propeller fan and shaft therefor, a hub provided with a set screw for detachable securement thereof to the shaft, a shoulder formation on the hub, a reduced-diameter portion on the hub adjacent the shoulder formation, a cup including a substantially planar plate and a peripheral flange on the plate, said plate being provided with a plurality of recesses, the shoulder portion of the hub being provided with a plurality of outstruck projections, said recesses being adapted to receive and be interfitted by said projections, a compressive disc disposed in said cup under compression such that a portion thereof extends into the recesses of the cup, a fan spider including a center disc portion centrally provided with a hub aperture of larger diameter than, and carried on the reduced-diameter portion of the hub, a non-metallic vibration-suppressing annulus on the hub and within the center aperture of the spider disc, the center disc of the spider being provided outwardly of its center opening with a plurality of spaced apertures, a second compressive disc located adjacent to the outermost face of the spider center disc under an appreciable compression such that portions of the cushioning discs under compression extend into said outer apertures of the spider center disc, a second cup including a plate portion and a flange portion, apertured to receive and extended over the reduced-diameter portion of the hub, and provided with a plurality of recesses, portions of the second compressive disc extending into the recesses located in the second said cup, a washer located exteriorly adjacent to the second said cup, the hub having a deformed portion coacting with the shoulder formation for the retention of the cups, discs and spider in fixed axial and angular position on the hub, the flanges of the two said cups being located in spaced relation to the adjacent portions of the spider and center disc thereof.

6. In an assembly including a propeller fan and shaft therefor, a hub provided with a set screw for detachable securement thereof to the shaft, a shoulder formation on the hub inwardly of one end thereof, a reduced-diameter portion on the hub adjacent the shoulder formation, a metal cup including a substantially planar plate and a peripheral flange on the plate, said plate being provided with a plurality of recesses, the shoulder portion of the hub being provided with a plurality of outstruck projections, said recesses being adapted to receive and be interfitted by said projections, a substantially compressive damping and cushioning disc disposed in said cup under compression such that a portion thereof extends into the recesses of the cup, a fan spider including a center disc portion centrally provided with a hub aperture of larger diameter than, and carried on the reduced-diameter portion of the hub, a non-metallic vibration-suppressing annulus on the hub and serving as a centering piece within the center aperture of the spider disc, the center disc of the spider being provided outwardly of its center opening with a plurality of spaced apertures, a second compressive disc located adjacent to the outermost face of the spider center disc under an appreciable compression such that portions of the cushioning discs under compression extend into said outer apertures of the spider center disc, a second cup including a plate portion and a flange portion, apertured to receive and extended over the reduced-diameter portion of the hub, and provided with a plurality of recesses, portions of second compressive disc extending into the recesses located in the second said cup, a metal washer located exteriorly adjacent to the second said cup, the hub having at its outer end, a deformed portion coacting with the shoulder formation of the hub for the retention of the cups, discs and spider in fixed axial and angular position on the hub, the flanges of the two said cups being located in spaced relation to the adjacent portions of the spider and center disc thereof.

References Cited in the file of this patent

UNITED STATES PATENTS

| | | |
|---|---|---|
| 1,584,955 | Leinweber | May 18, 1926 |
| 2,008,981 | Henkle | July 23, 1935 |
| 2,023,111 | Alsing | Dec. 3, 1935 |
| 2,041,555 | Lee | May 19, 1936 |
| 2,278,712 | Piron | Apr. 7, 1942 |
| 2,564,905 | Kaye | Aug. 21, 1951 |